Sept. 1, 1970  J. B. SWETT ET AL  3,526,335
STORAGE AND SERVING CONTAINER FOR FOODSTUFFS SUCH AS
CHILLED DESSERTS AND THE LIKE
Filed Aug. 12, 1968  3 Sheets-Sheet 1

INVENTORS.
JAMES B. SWETT
THOMAS E. BROWN
BY Paul R. Wylie
ATTORNEY

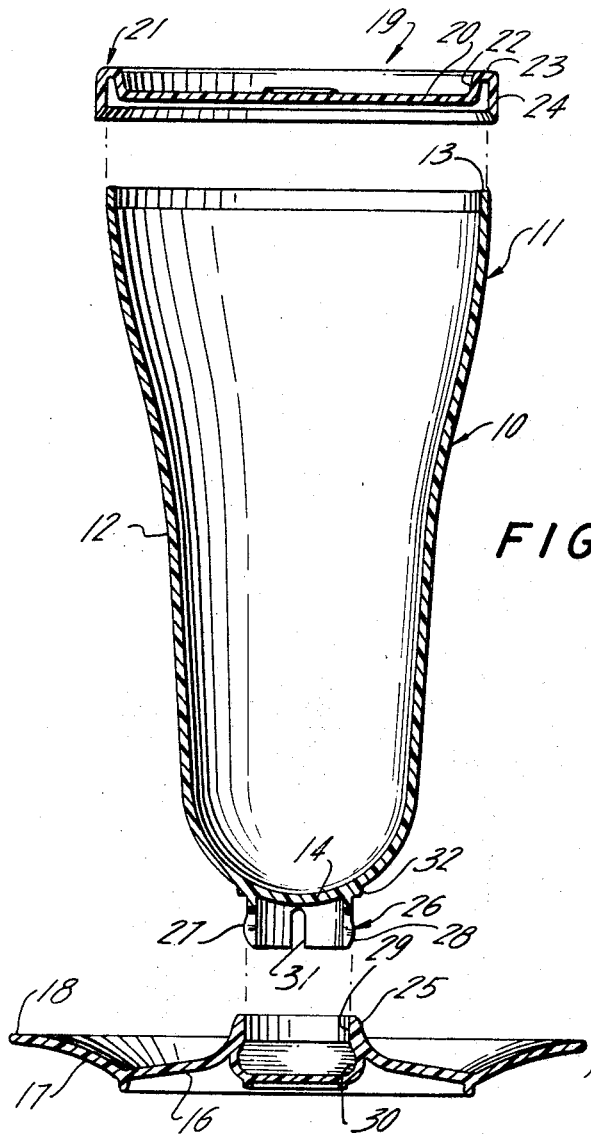
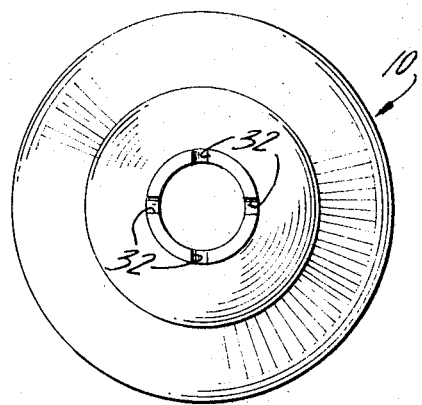
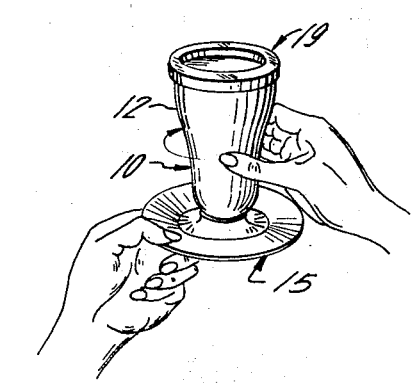

United States Patent Office 3,526,335
Patented Sept. 1, 1970

1

3,526,335
STORAGE AND SERVING CONTAINER FOR FOODSTUFFS SUCH AS CHILLED DESSERTS AND THE LIKE
James B. Swett, Barrington, R.I., and Thomas E. Brown, Birmingham, Mich., assignors to Dart Industries Inc., Los Angeles, Calif., a corporation of Delaware
Filed Aug. 12, 1968, Ser. No. 752,067
Int. Cl. B65d 7/42
U.S. Cl. 220—69     4 Claims

ABSTRACT OF THE DISCLOSURE

A storage and serving container in the form of a parfait dish having a sealable closure for refrigerator storage. A removable base is provided so that the container portion of the dish may be more easily handled and stored.

The base is formed as an upwardly turned saucer for serving of complementary foodstuffs such as cookies, wafers, etc. with a chilled dessert. The height and diameter relationship of various parts of the saucer portion and the container portion of the parfait dish are such that the dish can be positioned in close relationship with two or more similar dishes to minimize refrigerator storage space.

---

This invention relates generally to containers. More specifically it relates to plastic containers for storing and serving chilled foodstuffs such as ice cream desserts or the like. These containers are generally known as parfait dishes or dessert dishes.

Numerous parfait and/or dessert dishes have been available in the past. The majority of these dishes are formed of glass. Although the existing parfait dishes are entirely satisfactory for use, there are nevertheless some problems. First of all, none of the existing parfait dishes are provided with a seal so that the contents can be stored in a refrigerator in a moisture sealed manner. Moreover, none of the existing parfait dishes have an upwardly turned saucer shaped base to permit complementary food items such as cookies or wafers to be served with the chilled dessert. Additionally, most of the existing containers are formed integrally with a rather large base portion which consumes considerable space in the refrigerator.

According to this invention, applicants have provided a container for serving chilled foodstuffs and the like that solves the foregoing problems pertaining to existing parfait and dessert dishes.

It is an object of the invention to provide a storage and serving container for foodstuffs and the like having a sealable closure to eliminate loss of moisture from the contents of the container during refrigerator storage.

Another object of the invention is a provision of a container of a foregoing type having a saucer shaped base provided to permit serving of complementary foodstuffs such as cookies, etc. with the chilled dessert.

Still another object of the invention, in a specific embodiment thereof, is a provision of a removable saucer shape base for the container.

Still another object of the invention is a provision of a container of the foregoing type formed entirely of plastic materials.

Still another object of the invention is a provision of containers of the foregoing type which are nestable when their bases have been removed.

Still another object of the invention is provision of containers of the foregoing type that are adapted to be formed of plastic materials by injection molding techniques.

These and other objects will be apparent from the accompanying drawings which show a specific embodiment of the invention.

In the drawings:

FIG. 8 is an exploded cross sectional view in side elevation showing details of construction of the storage and serving containers according to the invention;

FIG. 9 is a top plan view of the saucer portion of the storage and serving container according to the invention; and, FIG. 10 is a perspective view illustrating some of the advantages of the storage and serving container according to the invention.

Figure 1:
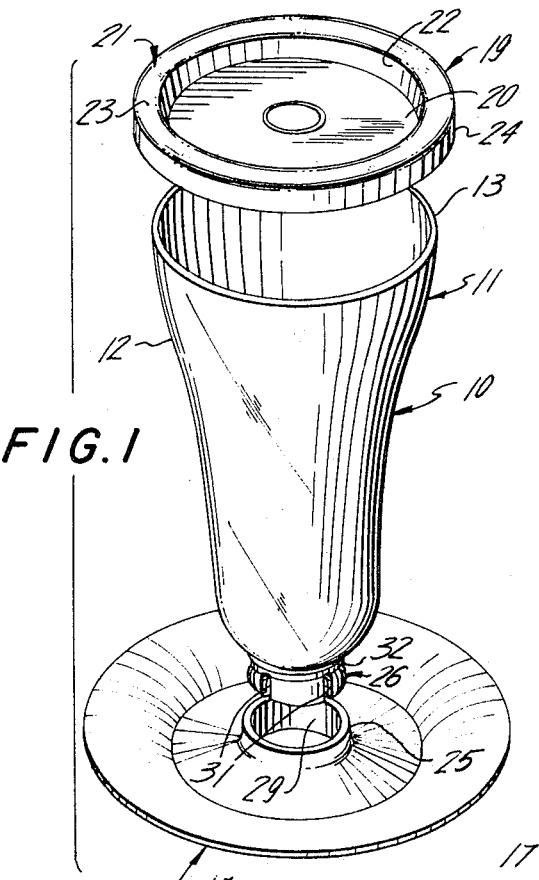
FIG. 1 is an exploded perspective view showing a storage and serving container according to the invention.

Referring now to the drawings, the storage and serving container 10 according to the invention includes a container portion, 11, which is shaped as an elongate parfait dish. The container portion has side walls 12 terminating in a peripheral edge 13 and a base wall 14. As shown, the container portion has a circular cross section.

The base of storage and serving container 10 is formed as a saucer portion 15. As seen in the drawings, the saucer portion is removable. The saucer is formed with a base 16 and an outwardly flared flange 17 which terminates in a peripheral edge 18.

For sealing the contents of the container in moisture tight relationship, closure 19 is provided. The closure has a main wall 20 and a sealing edge portion formed as a downwardly turned U-shaped groove 21. The U-shaped groove includes inner wall 22, top wall 23 and outer wall 24.

Figure 3:
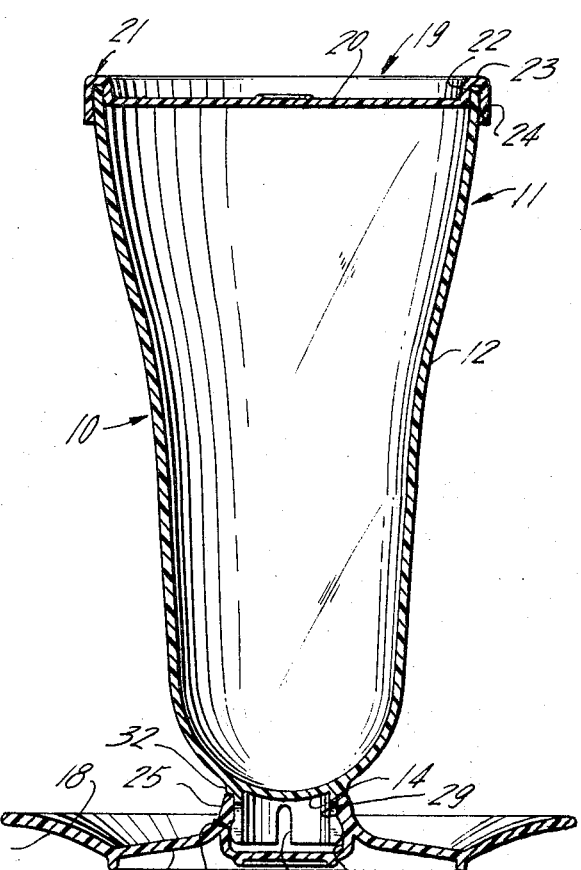
FIG. 3 is a view and cross section taken on line 3—3 of FIG. 2.
Figure 2:
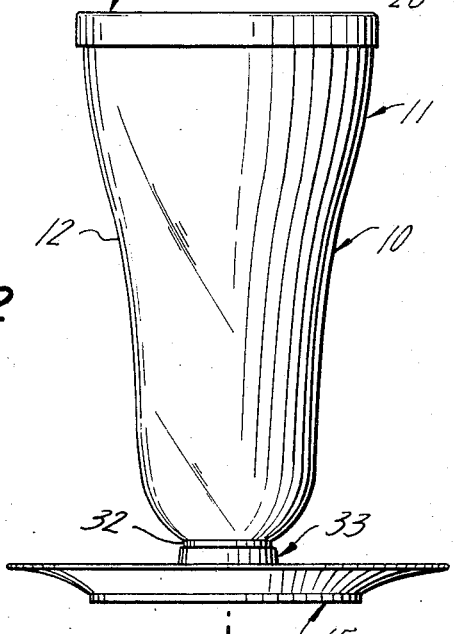
FIG. 2 is a side view thereof.

As noted, saucer portion 15 is removable from container portion 11. A joint between the two portions is provided by a socket 25 on the saucer and a complementary plug 26 on the container. The plug is formed with a downwardly extending wall 27 having a bead 28. The socket has a shoulder 29 and an undercut portion 30. Four slots 31 are spaced around the periphery of the plug wall. The slots are equi-distant from each other. When the container is assembled bead 28 is forced past shoulder 29 to a position in undercut portion 28 (FIG. 3). The curvatures of the bead 28 and the undercut portion 30 are such that a continuous downwardly directed force is exerted on the container 11 thus maintaining a tight fit between the upper edge of shoulder 29 and the shoulder 32 located above plug 26. This arrangement still permits the container 11 to be turned relative to the saucer. Moreover, the container 11 can easily be removed from saucer 15 by simply grasping the saucer in one hand, the container in the other and twisting while at the same time tipping the container relative to the saucer as shown in FIG. 10.

Figure 4:
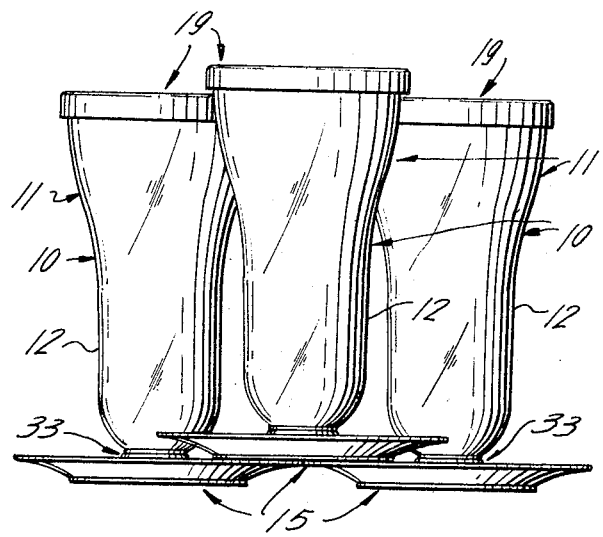
FIG. 4 is a side view showing three of the storage and serving containers according to the invention in a stacked relationship.

The storage and serving container as described, has several advantages. Due to the fact that saucer 15 is removable, a group of containers can be stored together in more limited spaces than those containers with permanently intact bases. Moreover, even if the saucer portion is left on, space economy can still be obtained. As an example of this latter advantage, FIG. 4 shows three storing and serving containers stacked together. The saucer portion 15 of one of the containers rests upon the peripheral edge 17 of the saucer portions of two other containers. This relationship is due to the height and diameter of the saucer and the height and diameter of the container portions. Thus, if a large number of filled containers of the type shown were to be placed in a refrigerator, they could be placed relatively close together. This has obvious advantages when considering the large numbers of such containers which might be prepared at one time.

The container 11 having plug 26 can also be connected with any connector socket of the type on the saucer. Of course, the converse is also true, and the saucer can be used with a variety of containers having a plug such as plug 26.

The socket and plug structure previously described form a convenient stem 33 between the container portion and the saucer portion.

Figure 6:
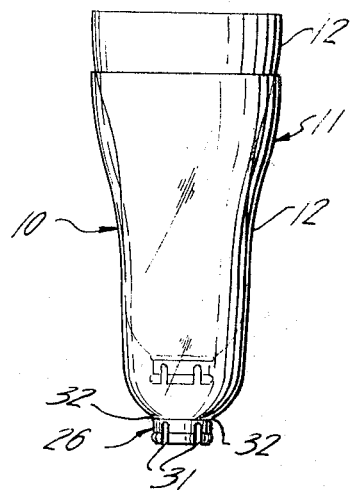
FIG. 6 is a side elevation view showing the container portions of two of the storage and serving containers according to the invention in a horizontal stored relationship.
Figure 7:
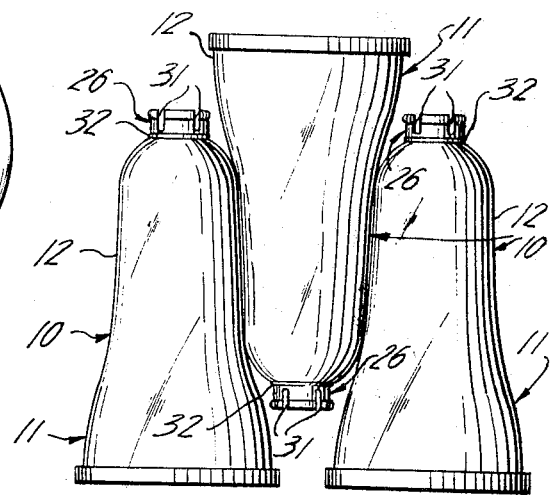
FIG. 7 is a side elevation of three of the storage and serving containers according to the invention in another stored relationship.
Figure 5:
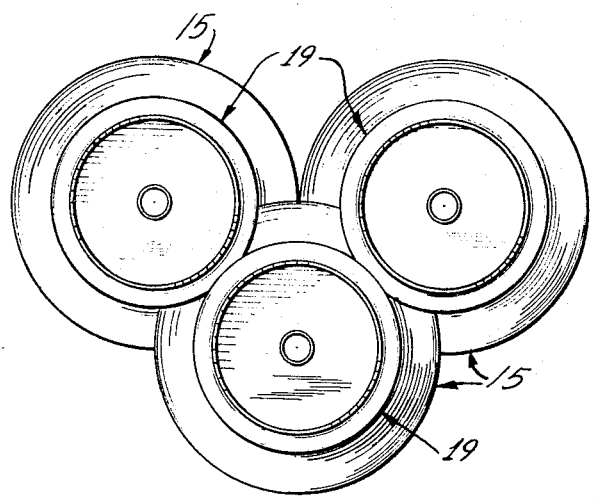
FIG. 5 is a top view of the container shown in FIG. 4.

Several advantages are also obtainable when the saucer portion is removed. As shown in FIG. 6, the empty containers are nestable. As shown in FIG. 7, the containers can be fitted quite closely together for shipping or storage.

Still another advantage of the invention is that the containers, when filled, can still be placed in a horizontal position for storage simply by placing closure 18 on the container 11. Due to the moisture tight relationship between the closure and the container, the contents cannot leak, even if they are in a liquid state.

The containers and saucers according to the invention can be made of any suitable plastic material by injection molding techniques. The containers are preferably formed of high density polyethylene or polypropylene. The saucer member is preferably formed of the same materials. The closure is preferably formed of low density polyethylene.

The foregoing describes a specific embodiment of the invention, the scope of which is defined by the following claims.

We claim:

1. A container for foodstuffs such as chilled desserts and the like and comprising: a container portion having integral side and bottom walls, said side walls terminating in a circular peripheral edge portion adapted to form a moisture-tight seal with a closure therefore, and a saucer portion connected to the bottom wall of said container portion and separated therefrom by a stem, said saucer portion including a base from which there outwardly extends an upwardly flared flange which terminates in a circular peripheral edge that is of a height and diameter with relation to the height and upper diameter of the container portion such that at least one such container can be positioned on the edges of the saucer portion of two or more like containers so that an upper portion of said one container may be in contact relationship with the periphery of the closures of the said two or more containers.

2. A storing and serving container according to claim 1, wherein said saucer portion is demountably attached to said container portion and adapted to be removed therefrom.

3. A storing and serving container according to claim 2, wherein coupling is provided between said container portion and said saucer portion, said coupling including a socket on said saucer portion, said socket including a shoulder at the upper opening thereof, and an undercut portion having smoothly angled side walls below said shoulder, and said container portion including a plug adapted to fit in said socket, said plug having annular side walls being formed with a bead on the outside of said side walls at the terminal edge thereof, and slots in said side walls extending from the terminal edge to the base of said container, the outside diameter of said bead being greater than the inside diameter of the shoulder portion of said plug, whereby said plug can be press fitted into said socket, said plug and socket forming the stem between said container portion and said saucer portion.

4. A storing and serving container according to claim 3 wherein the curvature of said bead and the curvature of said angled undercut are such that the mating surfaces thereof tend to draw the container and saucer members together when the plug is in assembled relationship with the socket.

References Cited

UNITED STATES PATENTS

| | | | |
|---|---|---|---|
| 2,101,401 | 12/1937 | Leppke | 220—23.83 |
| 2,589,967 | 3/1952 | Sawyer | 215—100.5 |
| 2,996,208 | 8/1961 | Schroeder | 215—99.5 |
| 3,079,037 | 2/1963 | Schechter | 220—69 X |
| 3,089,605 | 5/1963 | Buonauro | 220—69 X |
| 3,155,233 | 11/1964 | Tupper. | |
| 3,369,687 | 2/1968 | Walls | 215—99.5 X |

FOREIGN PATENTS 375,486  6/1932  Great Britain.

JOSEPH R. LECLAIR, Primary Examiner

J. R. GARRETT, Assistant Examiner

U.S. Cl. X.R.

215—99.5; 220—23.83